Aug. 23, 1938.  F. BENEDETTI  2,128,114
BOTTLE HOLDER
Filed May 28, 1937

Felix Benedetti
INVENTOR

Patented Aug. 23, 1938

2,128,114

UNITED STATES PATENT OFFICE 2,128,114

BOTTLE HOLDER

Felix Benedetti, Clifton, N. J.

Application May 28, 1937, Serial No. 145,355

1 Claim. (Cl. 232—41)

My invention relates to bottle holders and more particularly to that class for locking the bottles therein against removal by unauthorized persons.

One of the principal objects of my invention is to provide means for readily securing a bottle within a holder to prevent its being removed therefrom by an unauthorized person.

Another object of my invention is to provide a bottle holder that is simple in construction and operation and economical in manufacture.

Other objects and advantages will be apparent from the following description, appended claim, and annexed drawing.

Briefly stated, my invention comprises a bottle engaging means hinged to a base member adapted to be secured to a frame or the like, and provided with means for securing bottles within the frame in a locked condition.

Referring to the drawing wherein like reference characters designate like parts throughout the several views:

Fig. 1 is a perspective view of my invention secured to a door frame and having bottles locked thereto.

Fig. 2 is a longitudinal section thereof showing the frame in dropped position or in use.

Fig. 3 is a top plan view of a slightly modified frame.

In carrying out my invention, I utilize, as a preferred embodiment thereof, a strand of substantially stiff wire 5 to provide a frame having pairs of parallel spaced bottle engaging arms 6 and 7. The arms 6 and 7 terminate at the outer ends thereof, in looped sections 8 and 9 formed with apertures 21 and 22, and at their opposite ends with a pintle 10 having offset lugs 11 serving to secure the arms in spaced relation. Located intermediate of the sections 8 and 9 and the pintle 10, the inner strand is formed into a connecting section or loop 12 which is adapted to engage a bottle. A suitable base member 13, preferably formed of pressed steel, is adapted to be secured to a door frame 14 or the like by means of suitable screws 15. The blank of the base is folded upon itself in a manner to provide a pintle aperture 16 for receiving pintle 10. A suitable slot 17 is formed in the base for the reception of the lugs 11 of the pintle. Means is provided for securing the apertured sections of the arms together in a locked condition and comprises a pivoted bottle locking member 18, preferably constructed of sheet metal and formed with a channel 20 for receiving therein the apertured sections 8 and 9 of the arms. A suitable pivot pin 21a, in the form of a rivet, pivotally secures the same to the arms 6 and an aperture 22 formed in the member 18 is adapted to register with the aperture 22 in the section 9 for receiving therethrough the bow of a lock 23. The lock may be provided with a suitable chain 24 securing the same to the base 15 to prevent the misplacement thereof.

As illustrated in Fig. 1, my invention is shown as securing a number of milk bottles 25 within the frame. Bottles of this type are constructed with a large base and a narrow neck terminating in an enlarged rim. It is therefore essential that the inside distance between the arms 6 and 7 be slightly greater than the outside diameter of the neck of the bottle and less than the outside diameter of the rim. With particular reference to Fig. 1, wherein more than one bottle is used, the inside distance between the bottle locking member 18 and the loop 12 is to be of a dimension to permit said member and said loop to lie under the rims of the bottles when the base portions thereof are abutted laterally. In the instance where it is preferred to use a frame for securing one bottle only, the distance between the bottle locking member 18 and loop 12 is that of the outside diameter of the neck portion. While I have shown and described the bottle locking member 18 and loop 12 as contacting the bottles and being positioned under the rims thereof, it is to be understood that this feature, while desirable, is not essential to the operation of the invention for the reason that a sufficient amount of the rim will overlie the side arms 6 and 7, to prevent the bottles being removed therefrom when the frame is in locked condition as shown in Fig. 1. When the frame is not in use, it is dropped or swung downwardly to assume the position shown in Fig. 2.

While I have illustrated my invention as comprehending the use of milk bottles it is to be distinctly understood that other bottles and receptacles may be secured thereby and that various other forms and modifications in construction and materials may be resorted to without departing from the spirit of the invention or scope of the appended claim.

Having described my invention, what I claim is:

A bottle holder, comprising, a base member adapted to be secured to a door frame or the like, a frame provided with parallel spaced bottle engaging arms terminating in a pintle operable in said base at one end, said arms fashioned from a single piece of wire bent to form abutting longitudinally extending parallel sections terminating at the other end in outwardly offset sections having apertures, said arms and said sections adapted to receive therebetween necks of bottles without extending said arms relative to each other, a loop formed intermediate of said ends and connecting said arms together, a bottle locking member formed with openings adapted for registry with said apertures, a pivot pin in one of said openings and apertures for pivotally securing one end of said member to one of said sections, the other of said openings and apertures adapted to register with each other when said member is in locking position to receive the bow of a lock therethrough to lock the other end of said member to the other section whereby to lock a bottle between said arms, said arms spaced to embrace the sides of said base member when said frame is folded downwardly whereby said arms will abut and hug said door frame.

FELIX BENEDETTI.